United States Patent

Lloyd

[15] 3,699,357
[45] Oct. 17, 1972

[54] PEAK DETECTION CIRCUITS

[72] Inventor: George Howard Lloyd, Hertfordshire, England

[73] Assignee: Marconi Instruments Limited, London, England

[22] Filed: March 8, 1971

[21] Appl. No.: 121,769

[30] Foreign Application Priority Data

March 7, 1970  Great Britain..........11,031/70

[52] U.S. Cl...............307/235 A, 307/246, 328/146, 328/151
[51] Int. Cl......................H03k 17/28, H03k 17/30
[58] Field of Search ......307/235, 238, 246; 328/146, 328/147, 148, 149, 150, 151

[56] References Cited

UNITED STATES PATENTS

| | | | |
|---|---|---|---|
| 3,363,113 | 1/1968 | Bedingfield | 328/151 X |
| 3,470,482 | 9/1969 | Kolnowski | 307/246 X |
| 2,834,883 | 5/1958 | Lukoff | 328/151 |
| 2,652,460 | 9/1953 | Wallace, Jr. | 307/200 X |
| 3,145,345 | 8/1964 | Squillaro et al. | 328/151 X |
| 3,287,570 | 11/1966 | Wilson | 307/235 |
| 3,328,705 | 6/1967 | Eubanks | 328/151 |
| 3,543,169 | 11/1970 | Hill | 328/151 |
| 3,586,880 | 6/1971 | Fitzwater | 328/151 X |

OTHER PUBLICATIONS

Bjorkman et al., " Peak Picking and Noise Suppression Circuitry" , IBM Technical Disclosure Bulletin, Vol. 9, No. 6; p. 588– 589, 11/1966
Kennedy, " Variable Threshold Control," IBM Technical Disclosure Bulletin, Vol. 8, No. 4, p. 692– 693, 9/1965.

Primary Examiner—Herman Karl Saalbach
Assistant Examiner—L. N. Anagnos
Attorney—Baldwin, Wight & Brown

[57] ABSTRACT

A peak detection circuit has two capacitive storage stages. The first storage stage has a fixed discharge time constant, and the second storage stage has two switchably selectable discharge time constants, one of which is less than that of the first storage stage and the other greater. During measurement of a peak level the greater time constant is used to provide an accurate measurement, but between successive measurements the lesser time constant is selected to reduce the waiting time normally required between such measurements.

8 Claims, 1 Drawing Figure

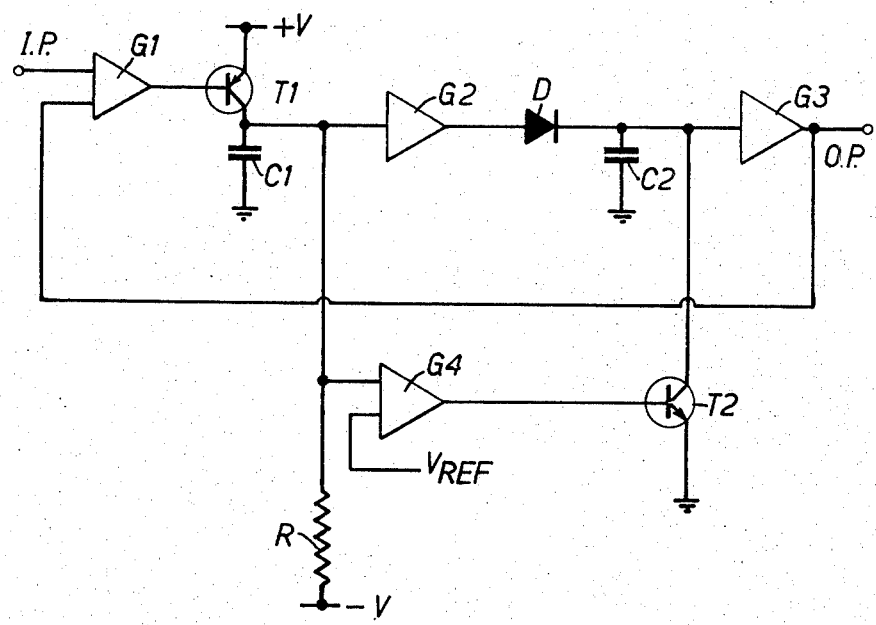

PEAK DETECTION CIRCUITS

This invention relates to peak detection circuits, particularly to A.C. peak voltmeters in which a potential indicative of a peak voltage to be measured is capacitively stored between successive voltage peaks.

For peak detection circuits of this kind to operate satisfactorily it is a basic requirement of the circuit that the stored potential indicative of a peak voltage to be measured does not appreciably decay between successive voltage peaks. This requirement can impose stringent design requirements on peak detection circuits which provide satisfactory operation at very low input signal frequencies (say below 20 Hz) and/or at low input levels. To ensure that the capacitively stored charge does not appreciably decay between successive voltage peaks it is necessary to provide that any discharge path for the storage capacitor has a very high impedance and to arrange that in operation the capacitor is only lightly loaded by any succeeding stage of the peak detection circuit.

Whilst circuits of this kind can be designed which operate well at low frequencies, such circuits generally have the disadvantage that when an input signal (for example a voltage to be measured) is removed or reduced the charge storing capacitor takes an excessively long time to discharge. The discharge time can be many seconds and during this time it is inadvisable to use the peak detector circuit for measuring other signals since an erroneous peak voltage indication could, under these circumstances, be obtained. In general, the better the performance of the peak detector circuit, the longer does the charge storing capacitor take to discharge and the greater is the aforementioned disadvantage.

An object of this invention is to provide a peak detection circuit which minimizes the aforementioned disadvantage without degrading the performance of the circuit.

According to this invention a peak detection circuit of the kind having a capacitive storage arrangement for storing a potential representative of the peak input signal level includes a first capacitive storage stage for storing a representative potential, and a second capacitive storage stage connected to the first stage, and also for storing a representative potential, the second stage having a discharge time constant which is long relative to that of the first stage and means for reducing this discharge time constant when the potential stored by the first stage has decayed below a selected level which is lower than that stored by the second stage.

Preferably the discharge time constant to which the second capacitive storage stage is reduced, when the potential stored by the first stage has decayed below a selected level which is lower than that stored by the second stage, is short relative to the discharge time constant of the first stage.

Preferably the means for reducing the discharge time constant of the second capacitive storage stage when the potential stored by the first stage has decayed below a selected level which is lower than that stored by the second stage, includes a transistor which in dependence on the potential stored by the first stage, provides a relatively low impedance discharge path for the second stage.

Preferably the said transistor is controlled by the output of a two input comparator, one input of which is fed with a potential representative of that stored by the first storage stage, and the other input of which is fed with a reference potential.

Preferably again the said peak detection circuit includes a feedback loop for feeding a signal level representative of the potential stored by the second capacitive storage stage to the first capacitive storage stage whereby the charging circuit for the said first stage becomes non-charging when the said signal level representative of the potential stored by the second stage exceeds the input signal level.

Preferably the said peak detection circuit includes a two-input comparator, the said feedback loop and the input for the said input signal each being connected to a respective input of the comparator, and the comparator being connected to means for controlling the charging current of the first capacitive storage stage such that if the input signal is greater than the signal level on the feedback loop the means allows the charging current to flow, whereas if the input signal is lower than the feedback signal the means cuts off the charging current.

Preferably the said means for controlling the charging current comprises a transistor switch.

The invention is illustrated in, and further described with reference to, the accompanying drawings which shows schematically one embodiment of the invention.

An A.C. signal whose peak voltage is to be measured by the peak detector circuit is in operation applied to one input of a differential amplifier G1, via an input terminal I.P. of the circuit. The output of the amplifier G1 is connected to the base of a p.n.p. transistor T1, the emitter of which is connected to a positive supply potential + V volts, and the collector of which is connected to one side of a first storage capacitor C1, the other side of which is connected to earth potential. The collector of transistor T1 is also connected to the input of a second amplifier G2, the output of which is connected to one side of a second storage capacitor C2 via a diode D. The other side of capacitor C2 is also connected to earth potential. The junction between the diode D and the capacitor C2 is connected to the input of a third amplifier G3, the output of which provides the output signal of the whole peak detector circuit, and which is used in addition to provide a feedback signal to the remaining input of the differential amplifier G1. Connected in shunt with amplifier G2 and the diode D is a fourth amplifier G4 and a n.p.n. transistor T2. The amplifier G4 is a differential amplifier one input of which is connected to the collector of transistor T1 and also via a resistor R to a source of potential - V volts and the other input of which is connected to a source of reference potential $V_{REF}$ volts. The resistor R in combination with the capacitor C1 provides the first capacitive storage stage. The output of amplifier G4 is connected to the base of the transistor T2, the emitter of which is at earth potential and the collector of which is connected to the input of amplifier G3. The four amplifiers G1, G2, G3 and G4 all have a very high input impedance and the discharge path of capacitor C1 is therefore provided mainly by resistor R the valve of which effectively determines the discharge time constant associated with a given value of capacitor C1. Similarly the discharge characteristic of capacitor C2 is determined by the impedance of the collector to emitter path of transistor T2 and by any leakage current due to diode D (assuming that the amplifier impedance is extremely large in comparison with the cut-off collector-emitter resistance) and capacitor C2 in combination with its discharge path provides the second capacitive storage stage.

In operation capacitor C1 is assumed to be initially discharged, and consequently the input signal to the associated one of the inputs of amplifier G4 is substantially at earth potential. The polarity of the reference voltage $V_{REF}$ is chosen so that under these conditions transistor T2 is maintained in a conductive state. This is necessary to ensure that capacitor C2 is also initially discharged.

When an input signal (being an A.C. voltage whose peak value is to be measured) is applied to amplifier G1, the signal is amplified and applied to the base of transistor T1 and causes capacitor C1 to charge up from the positive supply potential + V volts via this transistor. The discharge time constant of this capacitor C1 is determined by the value of the capacitor C1 and the resistor R, and is arranged to provide sufficient smoothing to ensure that the resulting output signal of amplifier G4 is of sufficient magnitude to switch transistor T2 and maintain this transistor in a non-conductive state. The partly smoothed signal is applied to the input of amplifier G2, the output of which charges capacitor C2 via the diode D. Since transistor T2 is held in a non-conductive state there is, assuming that the input impedance of amplifier G3 is very high, no low impedance discharge path for capacitor C2, and it therefore has associated with it a very long time constant. Thus the capacitor C2 provides a very high degree of smoothing and maintains a peak voltage with a minimum of ripple. This voltage is amplified by amplifier G3 and is utilized via output terminal O.P. as required, for example by a suitable meter for display or otherwise for readout purposes. The amplifying system is provided with a feedback loop from the output of amplifier G3 to an input of amplifier G1.

When the input signal is removed or reduced the charge retained by capacitor C2 provides a feedback signal via amplifier G3 to amplifier G1 which switches transistor T1 off, and allows capacitor C1 to discharge through resistor R. This in turn provides a signal via amplifier G4 which switches transistor T2 into a conductive state and therefore transistor T2 provides the means for reducing the discharge time constant of the second capacitive storage stage. Capacitor C2 is thereby rapidly discharged, and the output signal at terminal O.P. is reduced equally rapidly. Thus, the minimum time interval between successive measurements of peak voltage without risk of error is determined by the discharge time constant of the capacitor C1 - resistor R combination. As stated previously this time constant may be made as short as is desired provided that the degree of smoothing thereby obtained is sufficient to prevent the differential amplifier G4 and hence transistor T2 inadvertently being switched by the negative going portions of the input signal.

I claim:

1. A peak detection circuit, of the kind having a capacitive storage arrangement for storing a potential representative of the peak level of an input signal, including a first capacitive storage stage for storing a first potential representative of the peak level of the input signal and having a selected discharge time constant, a second capacitive storage stage, connected to the first stage, for storing a second potential representative of the peak input signal level, the second stage having a discharge time constant which is large relative to that of the first stage, means for comparing the first potential with a reference potential which is lower than the second potential, and means for reducing the discharge time constant of the second stage in response to decay of the first potential below the reference potential.

2. A peak detection circuit as claimed in claim 1 wherein the discharge time constant to which the second capacitive storage stage is reduced, when the potential stored by the first stage is reduced, when the potential stored by the first stage has decayed below said reference potential, is short relative to the discharge time constant of the first stage.

3. A peak detection circuit as claimed in claim 2 wherein the means for reducing the discharge time constant of the second capacitive storage stage when the potential stored by the first stage has decayed below said reference potential, includes a transistor which in dependence on the potential stored by the first stage, provides a relatively low impedance discharge path for the second stage.

4. A peak detection circuit as claimed in claim 2 including a feedback loop for feeding a signal level representative of the potential stored by the second capacitive storage stage to the first capacitive storage stage whereby the charging circuit for the said first stage becomes non-charging when the said signal level representative of the potential stored by the second stage exceeds the input signal level.

5. A peak detection circuit as claimed in claim 4 including a two-input comparator the said feedback loop and the input for said input signal each being connected to a respective input of the comparator and the comparator being connected to means for controlling the charging current of the first capacitive storage stage such that if the input signal is greater than the signal level on the feedback loop the means for controlling allows charging current to flow whereas if the input signal is lower than the feedback signal the means for controlling cuts off the charging current.

6. A peak detection circuit as claimed in claim 5 in which the said means for controlling the charging current comprises a transistor switch.

7. A peak detector circuit as claimed in claim 3 in which the said transistor is controlled by the output of a two input comparator, one input of which is fed with a potential representative of that stored by the first storage stage, and the other input of which is fed with a reference potential.

8. A peak detection circuit comprising, in combination;
a first capacitive storage device;
means for providing a fixed impedance discharge path to fixed potential for said first capacitive storage device and having, in combination therewith, a fixed discharge time constant;
means for receiving a periodic input signal and for charging said first capacitive storage device in response to and to a peak voltage level related to the peak level of such input signal;

a second capacitive storage device;

high impedance amplifier means having an input connected to said first capacitive storage device for charging said second capacitive storage device to a voltage level related to said peak voltage level to which said first capacitive storage device is charged;

variable impedance means for providing a discharge path to fixed potential for said second capacitive storage device; and means for comparing the instantaneous voltage level on said first capacitive storage device and for controlling said variable impedance means to provide a first discharge time constant for said second capacitive storage device which is long compared to said fixed discharge time constant when the instantaneous voltage level on said first capacitive storage device is above a selected value and to provide a second discharge time constant which is short compared to said fixed discharge time constant when said instantaneous voltage level decays below said selected value.

* * * * *